UNITED STATES PATENT OFFICE.

HENRY B. HOVLAND, OF DULUTH, AND GEORGE B. FRANKFORTER, OF MINNEAPOLIS, MINNESOTA; SAID FRANKFORTER ASSIGNOR TO SAID HOVLAND.

PROCESS OF TREATING METALLIFEROUS MATERIALS.

1,335,000.      Specification of Letters Patent.      Patented Mar. 30, 1920.

No Drawing.      Application filed August 15, 1913. Serial No. 784,945.

*To all whom it may concern:*

Be it known that we, HENRY B. HOVLAND and GEORGE B. FRANKFORTER, citizens of the United States, residing at Duluth, St. Louis county, and Minneapolis, Hennepin county, Minnesota, respectively, have invented certain new and useful Improvements in Processes of Treating Metalliferous Materials; and we do hereby declare the following to be a full, clear, and exact description of the invention, such as will enable others skilled in art to which it appertains to make and use the same.

This invention relates to processes of treating metalliferous materials; and it comprises treating metalliferous materials with a solvent for the metal sought in order to bring said metal into solution, precipitating the metal as a sulfid, and obtaining the precipitated sulfid by a suitable flotation process. The invention is more fully set forth in the following description and claims.

In recent years much attention has been given to the treatment of ores, particularly low grade ores, by so-called "flotation" processes, which, broadly speaking, consists in separating the desired constituent from associated gangue by causing it to float on the surface, where it is collected as a concentrate. Experience shows that the general class of metallic sulfids respond more readily to flotation methods than the general class of oxidized metals, including the oxids, carbonates, silicates, etc.

As a matter of fact, flotation processes have proved incapable of effectively separating metallic oxids, carbonates, and other oxidized forms of metals, as well as particles of free metal from the accompanying nonmetalliferous gangue, such metalliferous matter sinking for the most part with the gangue and being lost in the sands and slimes.

We are aware that it has been proposed to modify the character of non-sulfid ores by producing on the metalliferous particles thereof a coating or superficial layer of metallic sulfid and then to concentrate by flotation in the usual ways. According to such methods it is recommended to treat the ore with a sulfidizing agent under conditions such that the conversion of the oxidized metal into sulfid takes place directly *in situ* or at the surface of each metalliferous particle; the metal itself, in effect, not going into solution at any stage of the process so far as is discernible.

An object of the present invention is to obviate the objections to such processes heretofore proposed for concentrating non-sulfid ores by flotation, and to so treat metalliferous materials generally which are non-sulfid or partially non-sulfid in character, as to enable a ready and substantially complete separation of the values therein from the gangue by flotation. Besides ores properly so-called, concentrates, slimes, tailings, etc., are also adapted for treatment according to the present invention.

A further object of the invention is to render feasible the concentration by flotation methods of values present in certain classes of oxidized metalliferous materials which have heretofore defied concentration by any known methods. Among such classes of material may be mentioned particularly flue dust and slags from smelting operations. Owing to the physical characteristics and complex nature of these materials, the treatment of either for recovery of values therefrom has heretofore constituted a problem of extreme difficulty, quite distinct in this respect from the ordinary treatment of ores, concentrates, etc. It is probably for these reasons that no method has heretofore been worked out, or even suggested so far as we know, for concentrating values in flue dust and slags by the herein described process of solution, precipitation and flotation.

Further objects of the invention will appear as the description proceeds.

In carrying out the present process, we treat an ore or other metalliferous material with a suitable solvent to bring into solution substantially all the particular metal or metals to be subsequently won by flotation, or so much thereof as is non-sulfid in character; and by means of a suitable sulfidizing agent we precipitate the dissolved metal as a sulfid. Obtained in this way the precipitated metallic sulfid or mixture of precipitated sulfids, present in the material to be subjected to flotation, is all or very largely in a state of extreme subdivision approaching molecular fineness; and this means a condition in which the superficial area of the sulfid or sulfids exposed to the action of surface tension or other forces operating to lift up the sulfid particles by flotation, is a maximum. Moreover, the subsequent flotation treatment yields a supernatant froth or scum of sulfids which is remarkably coherent and easy to skim off the surface of the flotation liquor.

As particularly suitable for treatment by our new process may be mentioned materials carrying copper, lead, zinc, manganese, nickel, and cobalt, either associated, or not associated, with other metals comparatively insoluble in the more common solvents, such as sulfuric acid or sulfurous acid, which it is convenient to employ in practice. Such other metals may include, for example, silver and gold. In particular we contemplate the treatment of materials containing the desired metal in some oxidized form such as an oxid, hydrate, carbonate, sulfate, silicate, etc., or a mixture of any two or more of these compounds.

We regard the treatment of copper bearing materials as the most important application of the present process, although the invention is not limited thereto. Thus copper ores such as copper oxids, chrysocolla, malachite, and azurite can be treated with entire success by our process and with careful work, the final yield of copper is substantially equal to the theoretical copper content of the particular ore treated. Flue dust from copper smelting, containing gold and silver values in addition to copper, can also be treated for copper by the present process with particularly advantageous results, since the substantially complete removal of copper leaves the residue in ideal condition for extracting precious metal values therefrom by treatment with cyanid. Copper bearing slags can also be successfully treated by our process.

These specific applications of the process we regard as of particular importance.

For purposes of illustration the application of the present process to a copper bearing material such as a chrysocolla and copper carbonate ore may be briefly described. The ore is first suitably crushed and is best ground fairly fine, for example, to 40 or 60 mesh size, more or less, this being determined by the character of the particular ore. A quantity of rather dilute sulfuric acid solution, best containing in the neighborhood of about 5 per cent. sulfuric acid, is then added and caused to react upon the ore, the quantity of acid used being advantageously somewhat in excess of that chemically equivalent to the copper in the ore being treated. Excess of acid prevents precipitation of acid soluble sulfids in the subsequent sulfidizing step. Solution of the copper may be expedited by suitable agitation and mixing. Free access of air during the dissolving operation is advantageous.

A sulfidizing agent such as hydrogen sulfid, either in gaseous form or in aqueous solution, is introduced into the pulpy freely flowing mixture, whereby the copper is precipitated as sulfid. During this step it is well to keep the mass in agitation in order to thoroughly mix and aerate the reacting constituents. The metallic sulfid or sulfids thus obtained are artificially produced chemical precipitates and exhibit a marked tendency to coagulate, a property particularly advantageous in the subsequent steps. As soon as precipitation of copper sulfid appears complete, a suitable quantity of oily matter, as kerosene, or of other equivalent material is added to the pulp and agitation thereof under conditions favoring thorough aeration may be continued. The sulfids immediately begin to rise and collect on the surface as a froth or scum which can be removed readily, while the gangue particles sink and are removed as tailings.

The details of the procedure just described can be varied considerably. After the precipitation of the copper as sulfid, practically any effective flotation or separating method may be employed, that described being merely illustrative.

Instead of using as weak a solution of sulfuric acid as that indicated above, the ore may be treated with stronger solutions at first, such as 10 per cent. or greater strength, followed by suitable dilution with water. Such procedure advantageously expedites solution with some ores.

Sulfuric acid is usually employed in this process as the ore solvent because of its general applicability and cheapness. Other solvents may under some conditions be employed.

As above stated, a very important feature of the present invention is that it makes possible the successful treatment of flue dust, particularly flue dust from copper smelters. Heretofore the recovery of metallic values from flue dust has been a matter of expense and extreme difficulty.

The values carried by flue dust vary widely. A typical flue dust may contain from 4 to 15 per cent. copper, more or less, with considerable gold and silver. All the components of the furnace charge are also present in varying proportions. Almost invariably a flue dust is highly silicious. Much of the copper is present in oxidized form and the comparatively large copper content of flue dust has heretofore prevented the extraction of the precious metals therefrom by cyaniding.

By the present method it is possible to extract and separate the copper as well as the precious metals in flue dust with entire success. Generally speaking, the operation of treating flue dust may be conducted in much the same manner as described above for the treatment of a copper ore. Owing to the exceptional complexity of the combinations in which copper is present in flue dust, special conditions are sometimes required to dissolve the copper completely. For example, it is sometimes desirable to use a stronger acid solution than with ores, say as high as 20 per cent. sulfuric acid; and in some cases a small quantity of nitric acid may be added to the sulfuric acid solution. Heat may also be applied to expedite solution, the heat being readily obtained from the hot furnace gases in the vicinity. The residue of the flue dust, after removal of the copper, may then be cyanided to recover precious metals.

Various sudfidizing agents may be employed in our process, as, for example, hydrogen sulfid as a gas or in solution, or a soluble sulfid such as an alkali sulfid. As a rule we find hydrogen sulfid the most convenient sulfidizing agent to use.

Where hydrogen sulfid is employed, it may be prepared according to any of the known methods. Or it is advantageously prepared by treating copper matte with a suitable acid, such as sulfuric acid. As a rule it is advisable to crush the matte to a suitable degree of fineness in order that the acid may have more ready access to the ferrous sulfid in the matter. Hydrogen sulfid may also be supplied in situ in the pulp by adding to and mixing with the pulp finely ground matte or other material liberating hydrogen sulfid in conjunction with an acid.

It is to be understood that, while the process herein described is primarily adapted to the treatment of materials containing metal values in oxidized condition, nevertheless the presence of more or less metal sulfids in the materials to be treated is not precluded. It frequently happens that a sulfid ore contains part of its metal values in oxidized condition, and such an ore is well adapted to treatment in accordance with our invention, especially where the ore is highly silicious.

It is to be understood that the broad term "solvent" as hereinbefore employed may include a single acid, or mixtures of acids or alkalis or other solvents. In general we may employ any solvent capable of bringing into solution the particular metal or metals whose extraction is desired.

It is self-evident from the foregoing disclosure that reagents may be regenerated in the process and that there may be unused surplus of reagents in the water passing out with the tailings, and, furthermore, that such reagents may be recovered and used on fresh ores or materials.

What we claim is:

1. The process of obtaining metal values from material containing the same which comprises subjecting such material to the action of a solvent for the metal to be extracted from said material, precipitating the dissolved metal as sulfid in presence of gangue, and separating said sulfid from associated gangue by flotation.

2. The process of extracting copper values from copper bearing material which comprises dissolving copper from such material by means of a suitable solvent, precipitating the dissolved copper as sulfid in presence of gangue, and separating the copper sulfid from associated gangue by flotation.

3. The process of extracting copper values from copper bearing material which comprises dissolving copper from such material by means of a solvent containing a sulfuric acid radical, precipitating the dissolved copper as sulfid in presence of gangue, and separating the copper sulfid from associated gangue by flotation.

4. The process of extracting copper from material containing the same which comprises dissolving substantially all the copper present by means of a solution of sulfuric acid, precipitating copper as sulfid in presence of gangue, and separating copper sulfid from associated gangue by flotation.

5. The process of treating oxidized ores which comprises first dissolving certain metalliferous constituents with a suitable solvent, subsequently precipitating such dissolved constituents back into the pulp as sulfids, and concentrating the resulting pulp by a flotation process.

6. The process of treating oxidized ores which comprises dissolving certain metalliferous constituents with a suitable solvent, precipitating such dissolved constituents back into the pulp as sulfid, and concentrating the resulting pulp by a flotation process.

7. The process of treating copper-containing oxidized ores which comprises dissolving the copper with a suitable solvent, precipitating the copper back into the pulp and concentrating the resulting pulp by a settling treatment.

8. The process of treating copper-containing oxidized ores which comprises dissolving the copper with a suitable solvent, precipitating the copper back into the pulp as sulfid and concentrating the resulting pulp by a flotation treatment.

9. The process of treating copper-containing oxidized ores which comprises dissolving the copper with dilute sulfuric acid, precipitating the copper back into the pulp as sulfid, and concentrating the pulp by a flotation process.

10. The process of obtaining metal values from material containing base metal and precious metal which comprises subjecting such material to the action of a solvent, precipitating dissolved metal as sulfid, back into the mass, concentrating the resulting material by flotation and recovering precious metal from the residue by treatment with a precious metal solvent.

11. The process of obtaining metal values from material containing copper and precious metal, which comprises dissolving copper with a suitable solvent, precipitating the copper, as sulfid, back into the mass, concentrating the resulting material by flotation and recovering precious metal from the residue by treatment with a precious metal solvent.

In testimony whereof we hereunto affix our signatures in the presence of two witnesses.

HENRY B. HOVLAND.
GEORGE B. FRANKFORTER.

Witnesses:
R. F. STEWARD,
E. O. HILDEBRAND.